(12) United States Patent
Ashrafzadeh et al.

(10) Patent No.: US 9,010,133 B2
(45) Date of Patent: Apr. 21, 2015

(54) ON-LINE ENERGY CONSUMPTION OPTIMIZATION ADAPTIVE TO ENVIRONMENTAL CONDITION

(75) Inventors: Farhad Ashrafzadeh, Stevensville, MI (US); Ali R. Buendia-Garcia, St. Joseph, MI (US); Alberto Regio Gomes, St. Joseph, MI (US); Tushar Kulkarni, St. Joseph, MI (US); Andrew D. Litch, St. Joseph, MI (US); Peter J. Richmond, Berrien Springs, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 393 days.

(21) Appl. No.: 13/527,616

(22) Filed: Jun. 20, 2012

(65) Prior Publication Data
US 2013/0340450 A1 Dec. 26, 2013

(51) Int. Cl.
F25B 49/00 (2006.01)
F25B 49/02 (2006.01)

(52) U.S. Cl.
CPC ............. F25B 49/022 (2013.01); F25B 49/027 (2013.01); F25B 2600/0253 (2013.01); F25B 2600/111 (2013.01); F25B 2600/112 (2013.01); F25B 2600/23 (2013.01); F25B 2700/02 (2013.01); F25B 2700/15 (2013.01); F25B 2700/2106 (2013.01); Y02B 30/741 (2013.01); Y02B 30/743 (2013.01); Y02B 40/32 (2013.01)

(58) Field of Classification Search
USPC ........... 62/115, 127, 190, 211, 212, 223, 230, 62/441
See application file for complete search history.

(56) References Cited

U.S. PATENT DOCUMENTS

| | | | |
|---|---|---|---|
| 6,739,146 B1* | 5/2004 | Davis et al. | 62/155 |
| 7,110,832 B2 | 9/2006 | Ghent | |
| 7,561,977 B2 | 7/2009 | Horst et al. | |
| 7,778,734 B2* | 8/2010 | Oswald et al. | 700/276 |
| 2002/0029575 A1* | 3/2002 | Okamoto | 62/125 |
| 2008/0072610 A1* | 3/2008 | Venkatakrishnan et al. | 62/135 |
| 2010/0179708 A1 | 7/2010 | Watson et al. | |
| 2010/0207728 A1 | 8/2010 | Roscoe et al. | |
| 2011/0088415 A1 | 4/2011 | Lacey et al. | |
| 2011/0095017 A1 | 4/2011 | Steurer | |
| 2011/0098869 A1 | 4/2011 | Seo et al. | |
| 2011/0144807 A1 | 6/2011 | Buda et al. | |
| 2011/0145611 A1 | 6/2011 | Lee | |
| 2011/0148199 A1 | 6/2011 | Besore et al. | |
| 2011/0153100 A1 | 6/2011 | Besore et al. | |
| 2011/0153101 A1 | 6/2011 | Thomas et al. | |
| 2011/0153104 A1 | 6/2011 | Drake et al. | |
| 2011/0153109 A1 | 6/2011 | Drake et al. | |
| 2011/0175742 A1 | 7/2011 | Shin et al. | |

* cited by examiner

*Primary Examiner* — Melvin Jones

(57) ABSTRACT

An appliance includes an appliance housing, an interface adapted to receive power information, a plurality of sensors for sensing environmental conditions, a plurality of controls for controlling operations of the appliance, and an intelligent control. The intelligent control is disposed within the appliance housing and operatively connected to the interface and the plurality of sensors and adapted to dynamically select control values associated with the plurality of controls based on at least one of the power information, the environmental conditions, or a combination thereof to increase energy efficiency of the appliance.

27 Claims, 4 Drawing Sheets

ON-LINE ENERGY CONSUMPTION OPTIMIZATION ADAPTIVE TO ENVIRONMENTAL CONDITION

FIELD OF THE INVENTION

The present invention relates to appliances. More particularly, but not exclusively, the present invention relates to appliances such as refrigerators which adapt to their environment in a manner which increases energy efficiency.

BACKGROUND OF THE INVENTION

Energy efficiency is important to the design of appliances such as refrigerators. Typically, a modern refrigerator performs various cycles in a manner that is calibrated for use in a typical environment which may be defined using a typical ambient temperature, humidity level, standard test-load, or otherwise. Thus, the appliance is programmed to meet specific conditions. Yet, environmental conditions may vary significantly which degrades the energy efficiency of the appliance. What is needed is an apparatus, system, or method that allows an appliance such as a refrigerator to adapt to its environment in a manner conducive to increased efficiency.

SUMMARY OF THE INVENTION

Therefore, it is a primary object, feature, or advantage of the present invention to provide an appliance which will adapt to its environment and enable it to run as efficiently as possible.

It is a further object, feature, or advantage of the present invention to optimize the on-line energy consumption of an appliance by adapting to environment conditions while maximizing performance.

According to one aspect, an appliance for use in an environment is provided. The appliance includes an appliance housing, an interface adapted to receive power information, a plurality of sensors for sensing environmental conditions, a plurality of controls for controlling operations of the appliance, and an intelligent control. The intelligent control is disposed within the appliance housing and operatively connected to the interface and the plurality of sensors and adapted to dynamically select control values associated with the plurality of controls based on at least one of the power information, the environmental conditions, or a combination thereof to increase energy efficiency of the appliance. The interface may provide for connecting with a smart grid, an onboard wattmeter, or other wattmeter at the appliance.

According to another aspect, a refrigerator for use in an environment is provided. The refrigerator includes a refrigerator cabinet, a compressor disposed within the refrigerator cabinet, an interface adapted to receive power information, a plurality of sensors for sensing environmental conditions, a plurality of controls for controlling the refrigerator, and an intelligent control disposed within the refrigerator cabinet and operatively connected to the interface and the plurality of sensors and adapted to dynamically select control values associated with the plurality of controls based on at least one of the power information, the environmental conditions, or a combination thereof to increase energy efficiency of the refrigerator.

According to another aspect, a method for controlling an appliance within an environment is provided. The method includes providing the appliance, the appliance comprising (a) an appliance housing, (b) an interface adapted to receive power information, (c) a plurality of sensors for sensing environmental conditions, (d) a plurality of controls for controlling operations of the appliance, and (e) an intelligent control disposed within the appliance housing and operatively connected to the interface and the plurality of sensors. The method further includes dynamically selecting control values associated with the plurality of controls based on at least one of the power information, the environmental conditions, or a combination thereof to increase energy efficiency of the appliance. The appliance may include a fan and the control values may include a fan time delay. The appliance may include a compressor disposed within the appliance housing, the plurality of controls may include a compressor speed control and the control values include a compressor speed. The appliance may include a fan disposed within the appliance housing, the plurality of controls may include a fan control, and the control values include a fan time delay. The power information may include power quality or load information. The method may further include computing by the intelligent control of the control values based on at least one of the power information, the environmental conditions, or the combination thereof. The method may further include calculating an environmental condition from sensed data and wherein the dynamically selecting the control values associated with the plurality of controls is at least partially based on the sensed data. The method may further include receiving sensor data from a second appliance in operative communication with the appliance and wherein the dynamically selecting the control values associated with the plurality of controls is at least partially based on the sensed data.

DETAILED DESCRIPTION OF THE PREFERRED EMBODIMENTS

Figure 1:
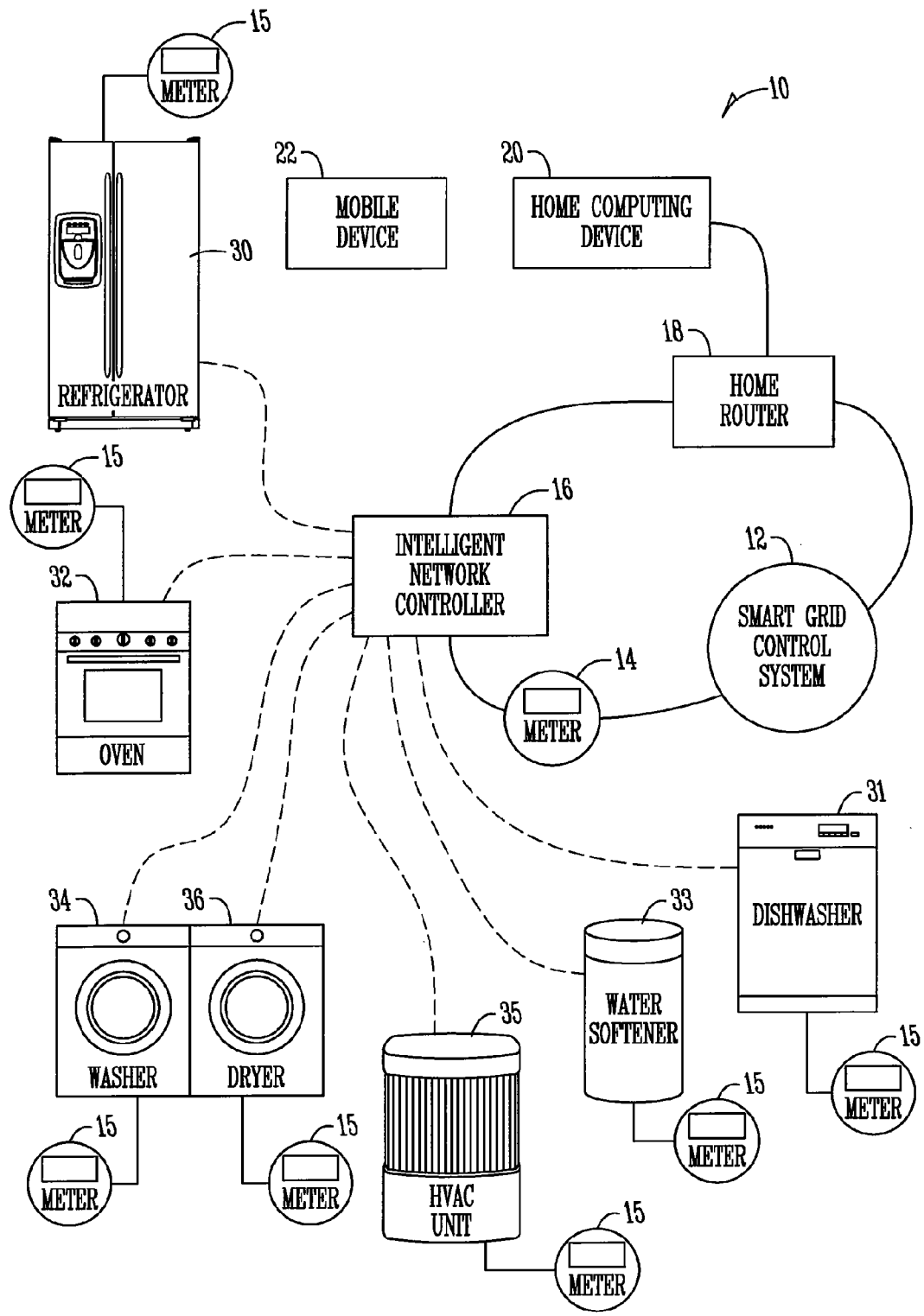
FIG. 1 illustrates one example of a system.

FIG. 1 illustrates one example of a system 10. The system 10 includes a smart grid control system 12. An electric meter 14 such as the electric meter associated with a residence is operatively connected to the smart grid control system 12. An intelligent network controller 16 is operatively connected to the meter 14. A home router 18 is also operatively connected to the intelligent network controller 16. A home computing device 20 may be operatively connected to the home router 18. In addition, a mobile device 22 may be in operative communication with the home router 18. The intelligent network controller 16 may also be operatively connected to one or more appliances, such as a refrigerator 30, a dishwasher 31, an oven 32, a water softener 33, a washer 34, an HVAC unit 35, and a dryer 36. Information may be communicated to and from the appliances through powerline networking and/or wirelessly.

As shown in FIG. 1, each of the appliances 30, 31, 32, 33, 34, 35, 36 may have a power meter or watt meter 15 associated therewith. The power meter or watt meter 15 may be integrated into the appliance 30, 31, 32, 33, 34, 35, 36, such as in the form of an onboard watt meter 15, or may be external and operatively connected to the appliance 30, 31, 32, 33, 34, 35, 36.

In operation, a system 10 may be used to convey information from the smart grid control system 12 to the appliances 30, 31, 32, 33, 34, 35, 36. The appliances 30, 31, 32, 33, 34, 35, 36 provide for on-line energy consumption optimization adaptive to the environment conditions through connectivity and power information including from a smart grid's wattmeter. The appliances 30, 31, 32, 33, 34, 35, 36 may allow for dynamically choosing control values based on the environment, information from the smart grid or through alternative means of user input.

Figure 2:
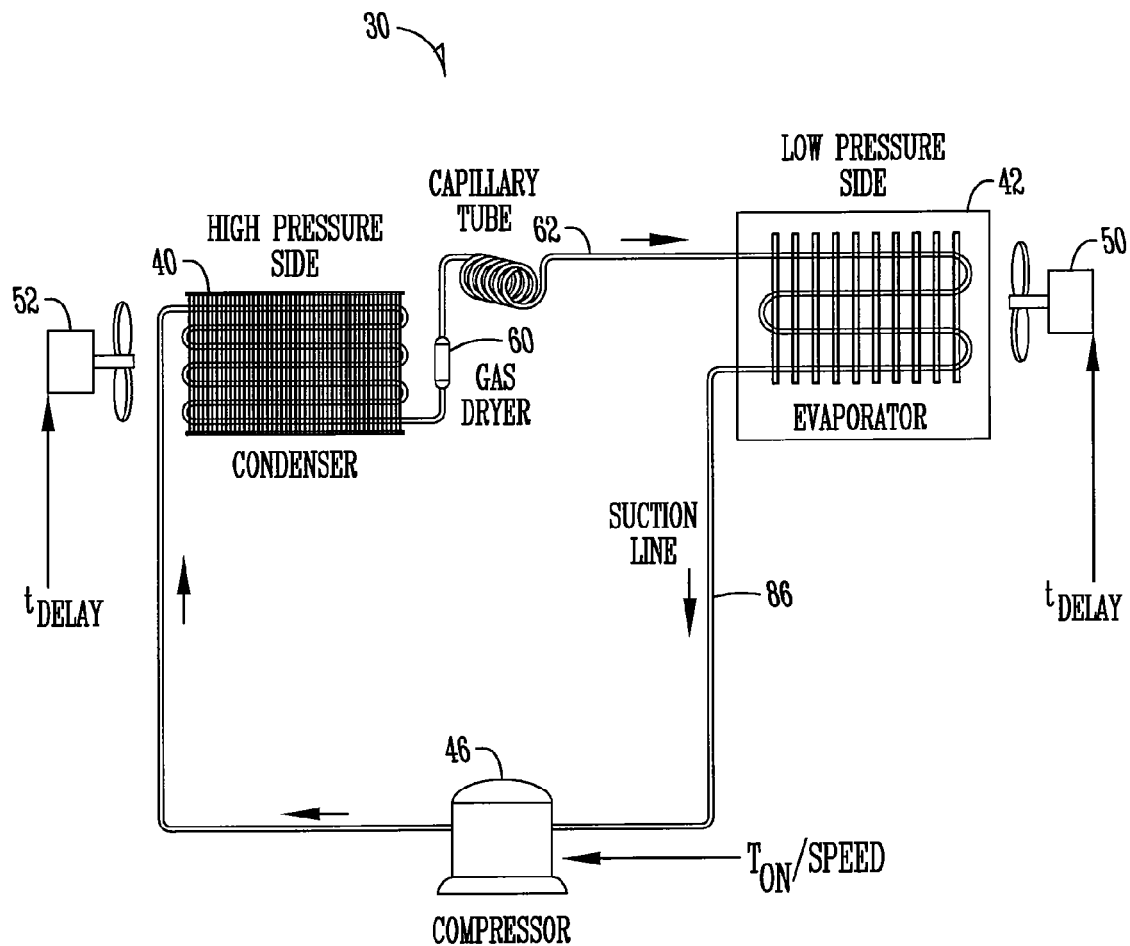
FIG. 2 illustrates one example of a cooling system of an appliance.

FIG. 2 illustrates a diagram of a cooling system of a refrigerator 30. The cooling system includes an evaporator 42, a compressor 46, and a condenser 40. A fan 50 is positioned at the evaporator and a fan 52 is positioned at the condenser. A suction line 48 is shown between the compressor 46 and evaporator 42 and a capillary tube 62 and gas dryer 60 are shown between the condenser 40 and the evaporator 42.

As shown in FIG. 2 there are parameters such as the time delay, $t_{delay}$, associated with fan 50, the temperature at which the compressor is turned on $T_{on}$, and the speed associated with the compressor as well as the time delay, $t_{delay}$, associated with fan 52. These are examples of different control values which may be modified based on information from the smart grid or through alternative means of user input, or based on other environment information. Thus, this is an example of how on-line energy consumption may be optimized by adapting to environmental conditions while still maximizing or maintain performance. For example, even though the fan delay and compressor speed are adapted to optimize on-line energy consumption, the temperature is still maintaining at the desired threshold.

Figure 3:
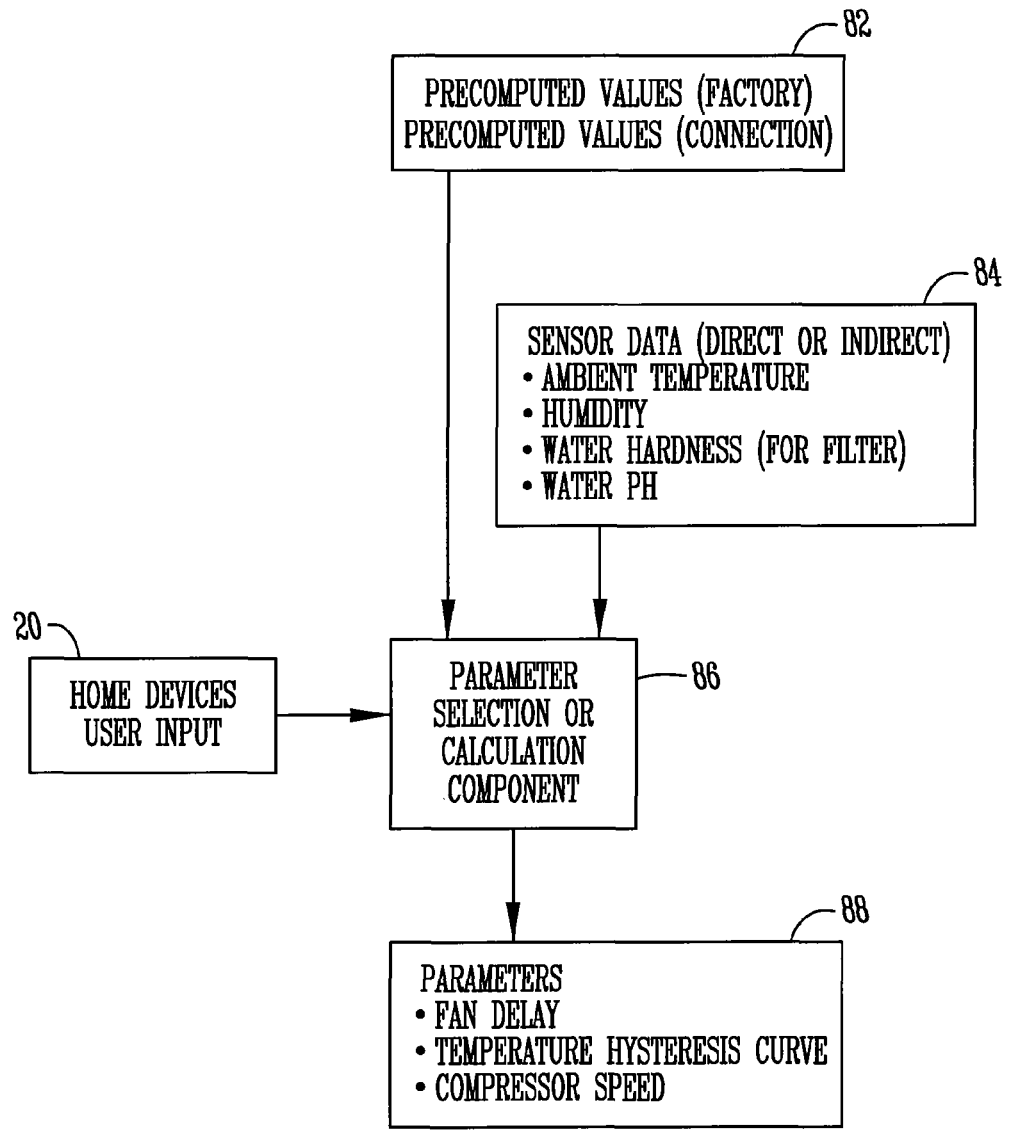
FIG. 3 illustrates one example of information flow associated with an appliance.

FIG. 3 illustrates one example of information flow. Home devices or user input 80 provide information which may be used by a parameter selection component 86. The parameter selection component 86 may be implemented in software stored on a machine readable storage medium and executed by an intelligent control such as a processor or microcontroller within an appliance. The parameter selection component 86 may also receive pre-computed input 82 such as pre-computed values which are determined at the factory or pre-computed values which are obtained over a connection. In addition, sensor data 84 may be communicated to the parameter selection component 86. Sensor data 84 may include ambient temperature data sensed with an ambient temperature sensor. Sensor data 84 may also include humidity data sensed with a humidity sensor. Sensor data 84 may also include water-related data such as water hardness sensed with a water hardness sensor. Sensor data may further include pH data, such as may be sensed with the pH sensor. Sensor data may be used to provide parameters from direct measurements. Alternatively, parameters may be acquired indirectly such as by using sensors to infer or estimate parameters not directly measured. For example, load size may be estimated instead of directly measured. In some cases there is no load sensor in a washer. In such an instance, motor power information can be used to infer the load such as described in U.S. Published Patent Application No. 2006/0242768 (METHOD AND SYSTEM FOR MONITORING LOAD SIZE AND LOAD IMBALANCE IN WASHING MACHINE) herein incorporated by reference in its entirety. Another example of obtaining parameters without needing a direct measurement is calculating humidity as a function of the difference of temperature of the inlet and exhaust of the dryer plus the power information of the dryer-heater. Thus, it should be understood that parameters need not be provided by direct measurements as parameters may otherwise be obtained.

The parameter selection or calculation component 86 uses the data to set various parameters which control the operation of the refrigerator. Parameters may be calculated internally in appliances, obtained from other appliances, or calculated internally in the appliance. Examples of parameters 88 may include fan delay, the temperature hysteresis curve, compressor speed, or other type of parameters. Thus, based on the various inputs including environmental inputs, operation of the refrigerator can be adapted to changes in the environment in a manner that improves energy efficiency of the refrigerator.

For example, where the ambient temperature in which a refrigerator is located is less than an assumed ambient temperature which is used at the factory to configure the refrigerator, energy efficiency is potentially lost because, for example, the compressor may operate at a higher speed or for a longer duration or otherwise consume more energy than is necessary if the actual ambient temperature or average ambient temperature over a given time period was used in configuring operation of the refrigerator. Similarly, if the refrigerator is experiencing an ambient temperature which is more than the assumed ambient temperature which is used at the factory to configure the refrigerator, energy efficiency is potentially lost because, for example, the compressor may operate at a higher speed or for a longer duration, or otherwise consume more energy than is necessary if the actual ambient temperature or average ambient temperature over a given time period was used in configuring operation of the refrigerator.

In another example, where the humidity of the environment in which a refrigerator is located is higher or lower than an assumed humidity level which is used at the factory to configure the refrigerator, energy efficiency is also potentially lost because, for example, the compressor may operate at a higher speed or for a longer duration or otherwise consume more energy than is necessary if the actual humidity level or average humidity level over a given time period was used in configuring operation of the refrigerator.

In another example, water-related information, such as water hardness, sensed with a water hardness sensor and water pH sensed with a pH sensor may be used. Such data may be used to increase energy efficiency, water efficiency, and/or improve performance of an appliance such as by better prediction of when a water sensor should be replaced.

It is to be further understood that information from the watt meter 14 or one or more watt meters 15 may be used in various ways. Such information can, for example, be used to monitor energy efficiency so that adjustments in operation of the appliance may be made which improve energy efficiency. In another example, energy efficiency can be improved by taking into consideration information regarding power quality from the smart grid. Power quality may include metrics such as power factor and harmonics. Poor power quality can result in reduced energy efficiency. In addition, the appliance may use information from the smart grid wattmeter 14 to adjust cycles to avoid activation during times of peak conditions while remaining as energy efficient as possible. The power meter or volt meter 14 may also deliver other types of power information such as the amount of energy consumed.

It is to be further understood that the appliance may receive information directly affecting control values or setpoints over a communication network. For example, if at the manufacturer it is determined that energy efficiency can be increased with a particular set of control values or set points, this information may be conveyed to the appliance through the smart grid. Thus, the appliances may allow for dynamically choosing control values based on the environment, information from the smart grid or through alternative means of user input.

It is to be further understood that environmental information originated within one appliance may be shared. Returning to FIG. 1, sensors associated with the refrigerator 30 which measure humidity may send humidity data to the intelligent network controller 16. the intelligent network controller 16 may then communicate the data to the dishwasher 31 which adjusts a drying cycle using the humidity data to improve performance.

Similarly, the dishwasher 31 may measure the water hardness or accept user input regarding the value of the water hardness. The dishwasher 31 may then share this information with other appliances through the intelligent network controller 16 or otherwise. For example, information regarding water hardness may be shared with the water softener 33, or refrigerator 30 to improve their operations.

Another example is that the washer 34 may calculate a dry load. This information may then communicate that information through the intelligent network controller 16 or otherwise to the dryer 36 to adapt parameters associated with the drying cycle to improve energy efficiency, or other performance characteristics.

It is to be further understood that environmental information need not be obtained from direct measurement but may be determined indirectly or inferred by performing calculations using known information.

Figure 4:
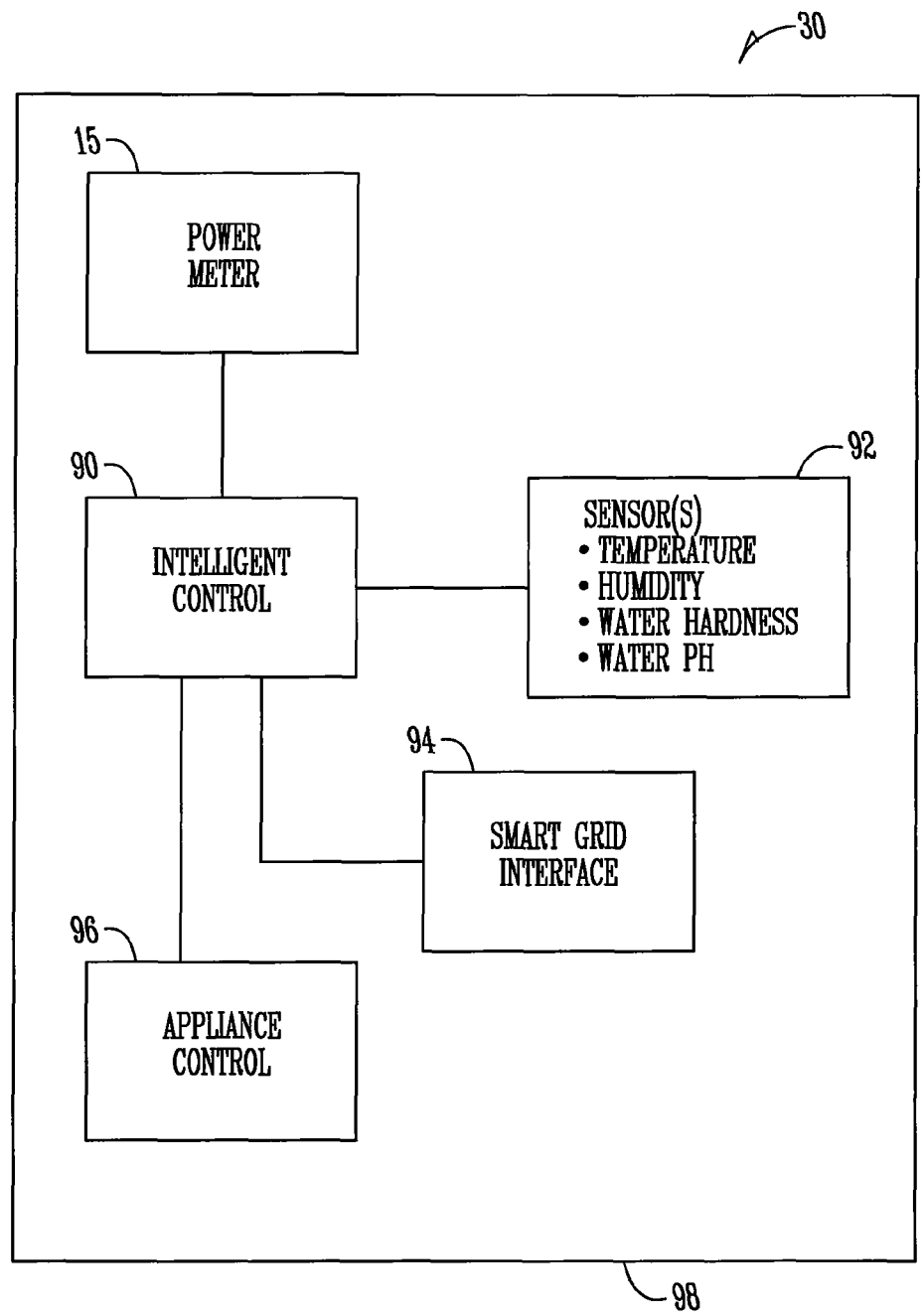
FIG. 4 is a block diagram of an appliance.

FIG. 4 illustrates one example of an appliance in the form of a refrigerator 30 with a refrigerator cabinet 98 as an appliance housing. The refrigerator 30 includes various components such as a compressor, evaporator, and fans shown in FIG. 2. The refrigerator 30 includes an intelligent control 90. One or more sensors 72 are operatively connected to the intelligent control 90 for sensing environmental conditions. Examples of sensors 92 may include a temperature sensor, a humidity sensor, a water hardness sensor, and a water pH sensor. Of course, the present invention contemplates that other sensors may be used. an interface 94 adapted to receive power information from a smart grid is also operatively connected to the intelligent control. In addition, a plurality of appliance controls 96 for controlling operations of the appliance are operatively connected to the intelligent control. The power meter 15 may also be operatively connected to the intelligent control 90 for providing power information such as load information, energy consumption information, and power quality. For example, the power meter 15 may be an onboard power meter.

Thus, an appliance has disclosed which allows for optimizing on-line energy consumption by adapting to environmental conditions while maximizing or maintaining performance. All parameters selected can optimize the energy consumption while preserving and improving performance. For example, where the appliance is a dryer, during a drying cycle the water temperature may be reduced while increasing the drying time in order to preserve the drying performance score while reducing energy consumption. Similarly, in a refrigerator the fan delay or compressor speed may be adjusted due to environmental conditions, but the temperature of the temperature of the refrigerator may be maintained at a desired threshold.

The above described embodiments are for illustrative purposes only and do not limit the scope of the claimed invention. The invention is only to be limited by the claims appended hereto. Therefore, other changes not mentioned explicitly are intended to be included as part of the scope of the invention. This may include the type of appliance, the number or type of sensors, the type of controls, the type of environmental conditions, the type of control values, and other options, variations, and alternatives.

What is claimed is:

1. An appliance for use in an environment comprising:
an appliance housing;
an interface adapted to receive power information;
a plurality of sensors for sensing environmental conditions;
a plurality of controls for controlling operations of the appliance;
an intelligent control disposed within the appliance housing and operatively connected to the interface and the plurality of sensors and adapted to dynamically select control values associated with the plurality of controls based on at least one of the power information, the environmental conditions, or a combination thereof to increase energy efficiency of the appliance.

2. The appliance of claim 1 wherein the interface is adapted to receive the power information from a smart grid.

3. The appliance of claim 1 wherein the appliance further comprises an onboard power meter and the interface is adapted to receive the power information from the onboard power meter.

4. The appliance of claim 1 wherein the intelligent control is further adapted to calculate or estimate environmental conditions based on data from the plurality of sensors.

5. The appliance of claim 1 wherein the appliance includes a fan and the control values include a fan time delay.

6. The appliance of claim 1 wherein the appliance includes a compressor disposed within the appliance housing, the plurality of controls include a compressor speed control and the control values include a compressor speed.

7. The appliance of claim 1 wherein the appliance includes a fan disposed within the appliance housing, the plurality of controls include a fan control, and the control values include a fan time delay.

8. The appliance of claim 1 wherein the plurality of sensors include a temperature sensor for sensing ambient temperature.

9. The appliance of claim 1 wherein the plurality of sensors include a humidity sensor for sensing humidity.

10. The appliance of claim 1 wherein the plurality of sensors include a water hardness sensor.

11. The appliance of claim 1 wherein the plurality of sensors include a pH sensor.

12. The appliance of claim 1 wherein the appliance is a refrigerator and wherein the appliance housing is a refrigerator cabinet.

13. The appliance of claim 1 wherein the power information comprises power quality.

14. The appliance of claim 1 wherein the power information comprises load information.

15. The appliance of claim 1 wherein the power information comprises energy consumption information.

16. The appliance of claim 1 further comprising a power meter operatively connected to the intelligent control.

17. The appliance of claim 1 wherein the intelligent control computes the control values based on at least one of the power information, the environmental conditions, or the combination thereof.

18. A refrigerator for use in an environment comprising:
a refrigerator cabinet;
a compressor disposed within the refrigerator cabinet;
an interface adapted to receive power information;
a plurality of sensors for sensing environmental conditions;
a plurality of controls for controlling the refrigerator;
an intelligent control disposed within the refrigerator cabinet and operatively connected to the interface and the plurality of sensors and adapted to dynamically select control values associated with the plurality of controls based on at least one of the power information, the environmental conditions, or a combination thereof to increase energy efficiency of the refrigerator.

19. The refrigerator of claim 18 wherein the interface is adapted to receive the power information from a smart grid.

20. The refrigerator of claim 18 further comprising a fan and the control values include a fan time delay.

21. The refrigerator of claim 18 wherein the plurality of controls include a compressor speed control and the control values include a compressor speed.

22. The refrigerator of claim 18 wherein the refrigerator includes a fan disposed within the refrigerator cabinet, the plurality of controls include a fan control, and the control values include a fan time delay.

23. The refrigerator of claim 18 wherein the plurality of sensors include at least one of a temperature sensor for sensing ambient temperature, a humidity sensor for sensing humidity, a water hardness sensor for sensing water hardness, or a pH sensor for sensing pH.

24. The refrigerator of claim 18 wherein the power information comprises at least one of power quality, load information, or energy consumption information.

25. The refrigerator of claim 18 wherein the intelligent control computes the control values based on at least one of the power information, the environmental conditions, or the combination thereof.

26. The refrigerator of claim 18 further comprising a power meter operatively connected to the intelligent control.

27. A method for controlling an appliance within an environment, the method comprising:
providing the appliance, the appliance comprising (a) an appliance housing, (b) an interface adapted to receive power information, (c) a plurality of sensors for sensing environmental conditions, (d) a plurality of controls for controlling operations of the appliance, and (e) an intelligent control disposed within the appliance housing and operatively connected to the interface and the plurality of sensors; and
dynamically selecting control values associated with the plurality of controls based on at least one of the power information, the environmental conditions, or a combination thereof to increase energy efficiency of the appliance.

\* \* \* \* \*